March 7, 1933. W. E. PACK 1,900,197
PITCH GAUGE
Filed Sept. 8, 1930
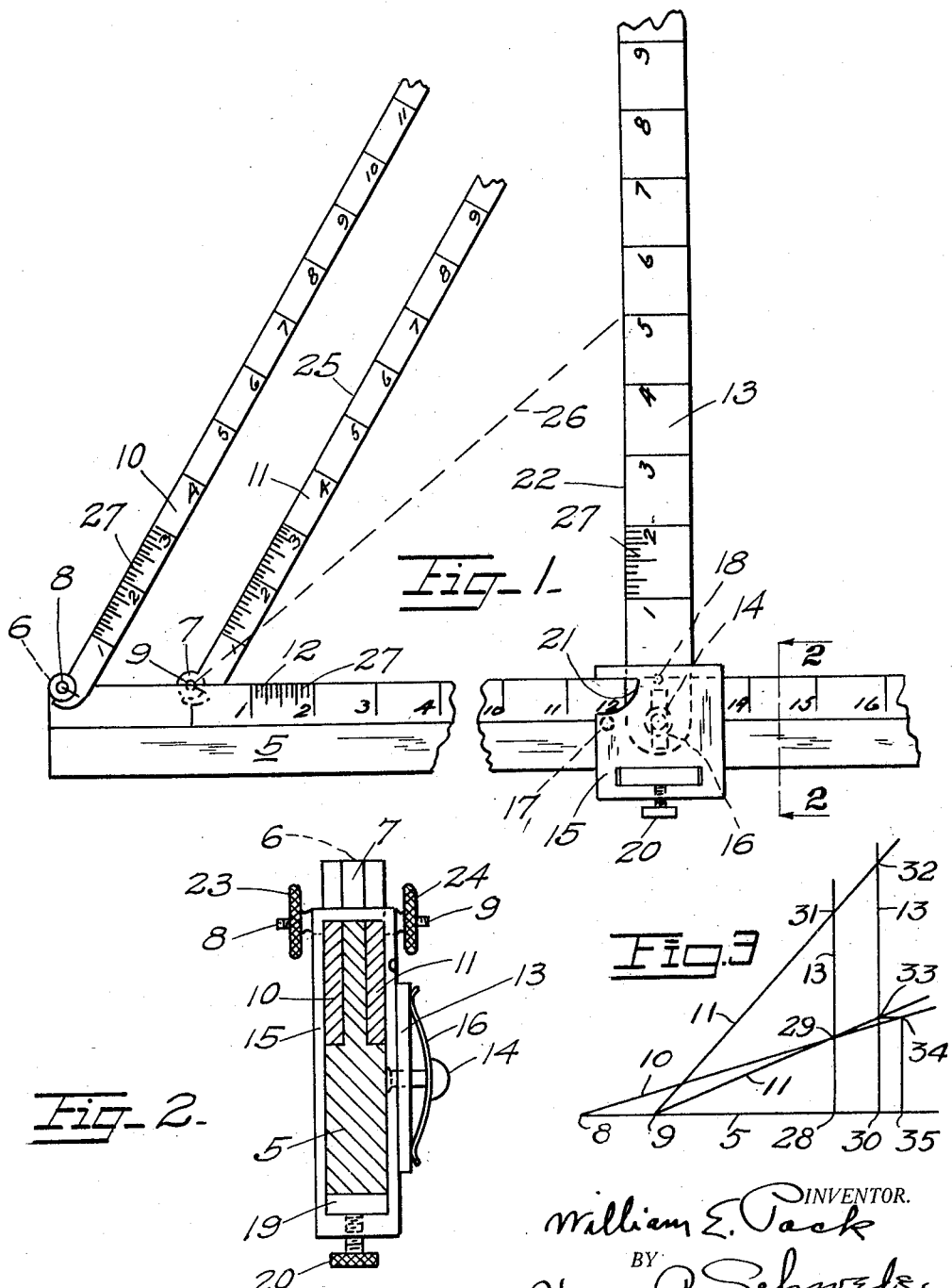

Patented Mar. 7, 1933

1,900,197

UNITED STATES PATENT OFFICE

WILLIAM E. PACK, OF OAKLAND, CALIFORNIA

PITCH GAUGE

Application filed September 8, 1930. Serial No. 480,406.

This invention is for a pitch gauge and has special reference to a gauge for laying off pitches and bevels and by means of which the length of diagonals may be read directly when the run and rise are known and the gauge set accordingly.

The main object of the invention is to provide a gauge for the use of carpenters, steel layer-outs and similar trades by which bevels and slopes may be layed off directly, and which may then be reset to give the length of a diagonal directly, thereby obviating the necessity for calculations.

Another object of the invention is to provide a device of the class described which may be folded into a compact unit when not in use and which may be economically constructed and conveniently manipulated.

Other objects and advantages of the invention will become apparent as the following description is read on the drawing forming a part of this specification.

The invention consists primarily of a horizontal scale having a vertical scale slidable thereon, with the zero division on the vertical scale coinciding with the top edge of the horizontal scale, and a pair of scales pivoted four and thirty-one thirty-seconds inches apart and on a line coinciding with the top edge of the horizontal scale, and frictionally held in adjustable relation by means of thumb screws or nuts, the pivoted scales having graduations starting at the respective pivots and the horizontal scale having graduations starting at the pivot of the innermost pivoted scale.

The invention is adequately illustrated in the accompanying drawing, in which

Fig. 1 is a broken plan view of the invention in open or extended position; and

Fig. 2 is a section taken on line 2—2 of Fig. 1 with the invention in folded position.

Fig. 3 is a diagrammatic view indicating the operation of the invention.

Similar reference characters are used to designate similar parts throughout the several views.

The horizontal scale 5 may be formed of a single strip of material, or may be built up of three strips to provide the enlarged lower portion as indicated in Fig. 2. Ears are provided at 6 and 7 to which are pivotally attached as at 8 and 9 the respective angularly adjustable slope scales 10 and 11 the pivotal points 8 and 9 being four and thirty-one thirty-seconds inches apart and in alignment with the upper edge 12 of the scale 5. Graduations start at the pivot center 9 and continue to the opposite end of the scale.

The angularly adjustable scales 10 and 11 are pivoted at 8 and 9 and are provided with graduations beginning at their pivot centers and continuing to the opposite end.

The vertical or rise scale 13 is pivotally mounted as at 14 on a carrier consisting of an encompassing frame 15 and is frictionally held by means of a leaf spring 16 and positively held in perpendicular and parallel positions by means of a pin or protuberance cooperating with indents or apertures as at 17 and 18, the graduations beginning at the coincidence with the top surface or edge 12 of the horizontal or run scale 5 when the rise scale 13 is perpendicular thereto.

The carrier consists of a rectangular frame 15 which is slidable on the run scale 5 and over the angularly adjustable scales 10 and 11 when folded down as indicated in Fig. 2, and is provided with a shoe 19 and a clamp screw 20 for adjustably clamping the rise scale 13 on the run scale 5. An indicator is provided at 21 by cutting the front face of the slide back to a point in alignment with the inner edge 22 of the rise scale 13. Knurled nuts 23 and 24 are provided for clamping the slope scales 10 and 11 in adjusted position, the pivots 8 and 9 having the ends threaded.

For carpenters' and sheet metal workers' use, it is preferable to graduate the various scales in inches and twelfths of an inch, as indicated at 27, whereby the scales may be read in inches and twelfths of an inch, or in feet and inches in which case each inch mark has a value of one foot and each twelfth inch a value of one inch.

The device is used in the following manner:

Where the pitch is given in inches rise per foot run, the rise scale 13 is first adjusted on scale 5 by sliding the carrier 15 outwardly to where the indicator edge 22 coincides with the graduation "12" on the run scale 5, which graduation is just one foot from the center of pivot 9, and indicated at 28, Fig. 3. The screw 20 is then tightened to secure the scale 13 in its adjusted position.

To obtain the slope angle, scale 11 is adjusted about pivot 9 to registry of edge 25 with the graduation corresponding to the rise in inches per foot run, at edge 22 of scale 13 as indicated by the dotted line 26, the position of the dotted line being that for a rise of five inches per foot run. The nut 24 is then tightened to secure scale 11 in the angularly adjusted position, and the slope angle is provided by the edge 25 relative to scale 5, this slope angle being that of the common rafter.

This adjustment coincidently gives the cheek cuts for the common rafters.

To obtain the length of the common rafters, with scale 11 retained in the adjusted position previously described, scale 13 is adjusted on scale 5 to the point of registry of indicator edge 22 with the graduation on scale 5, read in feet and inches corresponding to the total run. This adjustment coincidently gives the length of the common rafter and the total rise, the length of the common rafter being read at the coincidence of the graduated edges of scales 11 and 13 of scale 11, and the rise is read on scale 13.

To obtain the length of the hip rafter, scale 13 is first set at 12 on scale 5, scale 10 is next adjusted to coincide with the coincidence of scales 11 and 13 as shown at 29 in Fig. 3. Next, scale 13, with scales 10 and 11 retained in their adjusted position, is moved out to the graduation corresponding to the total run and the total rise read at 33 at the coincidence of scales 11 and 13, after which scale 13 is again moved outwardly to coincidence of the total rise on scale 13 with scale 10 which is the position 34, the distance 34—35 being identical to the distance 33—30. The length of the hip rafter is the distance 8—34, the length of the common rafter is the distance 9—33, the total run is the distance 9—30 and the run under the hip is the distance 8—35.

The distance 8—9 is $4\frac{31}{32}$ based on a run of 12 and is obtained by the following method of calculation:—

With a run of 12 ft. the run under the hip is equal to twelve times the secant of 45°, or 1.41422, therefore the run under the hip is equal to twelve times the secant or 16.970, and the difference between the run under the hip and the total run is 4.970 or $4\frac{31}{32}$.

Now if the point 29 Fig. 3 indicates the rise per foot and the point 28 is 12 inches from the point 9, obviously the point 28 will be 16.970 inches from point 8, and if the straight edges 10 and 11 set as shown in the Fig. 3 is continued to the right from the scale 13 to a distance of 16.970 inches from point 8 along scale 5, and a line drawn parallel to the base line 5, it will be found that the distance on this parallel line from coincidence with scale 11 to coincidence with scale 10 will also be $4\frac{31}{32}$, which proves that the device is accurate, inasmuch as the run under the hip or the length of the hip rafter would be twice as great for a 24 ft. run as for a twelve foot run.

The length of the jack rafters is obtained in the following manner:—

Having obtained the length of the hip rafter, scale 13 is adjusted on scale 5 to the total run, and scale 11 is adjusted on scale 13 to coincidence of the length of the hip rafter with scale 13 and scale 11 secured in adjusted position. Scale 13 is then moved on scale 5 to the spacing desired for the jack rafters, from one position to the next and in each position the length of the jack rafter for that position is obtained on scale 13 at the coincidence of scale 11. As shown in the drawing Fig. 3, the distance line 30 is the total run and the distance 9—32 is the length of the hip rafter and the distance 28—31 is the length of the jack rafter at a point 12 ft. from the corner of the roof.

The following description clearly discloses the method of use of the invention and will be based on a roof having a rise of "4 in 12" and a total run of 18 ft.

To obtain the total rise and length of a common rafter, with a total run of 18 ft. with a rise of "4 in 12", scale 11 is set on scale 13 at graduation "4" with scale 13 set at "12" on scale 5. Scale 13 is next adjusted on scale 5 to registry of edge 22 with graduation "18" (the total run), the other values, total rise 6 ft. and length of common rafter 18 ft. $11\frac{11}{16}$ inches being read respectively on scales 13 and 11 at point of coincidence.

It will be noted that this device is adapted for obtaining lengths and cuts of all common, hip, and jack rafters, irrespective of the slope, but is limited to hip and jack rafters for a turn of the cap of 90°, or a square corner building.

To obtain the run under the hip rafter, scale 13 is first adjusted on run scale 5 to the total run, or 18 ft. indicated at 30. Next, scale 11 is set on scale 13 to the total run or 18 ft. as indicated at 32, and the run under the hip, 25 ft. 5½ inches may then be read on scale 11 to the point of registry with scale 13, and being the distance between points 9 and 32.

To obtain the length of the hip rafter, scale 13 is adjusted on scale 5 to the run under the hip, 25 ft. 5½ inches and scale 11 is adjusted on scale 13 to the total rise 6 ft. and the length of the hip rafter 26 ft. 2⅜ inches may then be read on scale 11 at coincidence with scale 13.

To obtain the lengths of the studs under the hip, with scale 11 clamped in the last adjusted position, scale 13 is moved to the various positions or spacing of the studs and the lengths read on scale 13 at coincidence with scale 11.

To obtain the lengths of the jack rafters, set scale 13 on scale 5 to the total run, and scale 11 on scale 13, to the length of hip read on scale 11 and clamp scale 11, then move scale 13 on scale 5 to various jack rafter positions and read the length of the jack on scale 13 at coincidence with scale 11.

The length of the hip rafter may more conveniently and quickly be determined by means of scale 10. Scale 13 is first adjusted to position 28, one foot from pivot 9. Scale 11 is next adjusted to the rise per foot, position 29 and scale 10 adjusted to the same position as shown on Fig. 3 and both scales clamped in adjusted position. Scale 13 is then moved to the position 30, the total run read from point 9 of the total rise read at 33. Next, scale 13 is moved out to registry of the total rise, (line 33—34 being a transfer plane) with scale 10, the distance 30—33 and 35—34 being equal, and the length of the hip rafter is the distance between points 8 and 34 read on scale 10. This adjustment provides the cheek cuts for the jacks and cap cuts for studs under the hip rafter. The distance 8—35 is the length of run under the hip. It will be noted that the distance 9—32 is identical to the distance 8—34 and that of rafter lengths and cuts may be read directly irrespective of the slope of the roof.

By similar rules the length and cuts of any rafter used in the construction of any type of roof may be quickly determined, as also stair stringers, braces, brackets and similar angular parts and cuts.

The device is also especially applicable to steel layout and plate work, especially in the construction of hoppers, chutes and similar equipment.

The device is foldable into a compact space, by first sliding the carrier 15 back to where the scales 10 and 11 may be folded along scale 5 as indicated in Fig. 2, then sliding the carrier 15 forward over these scales and tightening the screw 20, releasing scale 13 from projection 18 and folding alongside of scale 5 to engagement with projection 17.

It will be noted that a specially convenient instrument is thus provided for carpenters, steel layer-outs, draftsmen and similar crafts and that variations in construction and arrangement which are consistent with the appended claims may be resorted to without detracting from the spirit or scope of the invention or sacrificing any of its advantages.

I claim:

1. A pitch gauge comprising a run scale, a rise scale slidably adjustable there-along, a hip scale pivoted at the working edge of said run scale and a slope scale pivoted at the working edge of said run scale at a distance from the pivot of said hip scale, equal to the difference between twelve inches and twelve times the secant of forty-five degrees.

2. A pitch gauge comprising a run scale, a pair of graduated scales pivoted to said run scale respectively adjacent one end and four and thirty-one thirty-seconds inches from the one end and a rise scale slidably adjustable along said run scale, the pivots being in alignment with the working edge of said run scale.

3. A pitch gauge comprising a run scale, a pair of angularly adjustable scales pivoted in alignment with the working edge of said run scale, the pivotal points being spaced substantially four and thirty-one thirty-seconds inches apart, a carrier, a rise scale pivotally mounted on said carrier, and means for retaining said rise scale in position perpendicular to said run scale, the graduations on said run scale beginning at the pivot of one of said angularly adjustable scales.

4. A pitch gauge comprising a run scale, a pair of angularly adjustable scales pivotally connected to said run scale in spaced relation and in alignment with the working edge of said run scale, the working edges of said angularly adjustable scales being in radial alignment with the pivot centers, a carrier slidably mounted on said run scale, a rise scale pivotally mounted on said carrier and adapted to be fixedly held perpendicular to said run scale, and securing means for said angularly adjustable scales and for said carrier.

5. A pitch gauge comprising a run scale having a graduated edge, a carrier slidably mounted on said run scale, means for securing said carrier in adjusted position on said run scale, a rise scale secured at one end to said carrier perpendicular to said run scale, a hip scale pivotally mounted at one end of said run scale, a slope scale pivotally mounted intermediate said hip scale and said rise scale.

6. A pitch gauge comprising a run scale, a carrier slidably mounted on said run scale, means for securing said carrier in adjusted position, a rise scale pivotally secured to said carrier and adapted to be fixedly retained perpendicular to said run scale, a hip scale pivoted at the working edge of said run scale, a slope scale pivoted at the working edge of said run scale at a distance from the pivot of said hip scale, equal to the difference between a predetermined value and the predetermined value times the secant of forty-five degrees.

In testimony whereof I have affixed my signature.

WILLIAM E. PACK.